United States Patent [19]

Dennison

[11] 4,098,962

[45] Jul. 4, 1978

[54] METAL-HYDROGEN SECONDARY BATTERY SYSTEM

[75] Inventor: Edward S. Dennison, Waterford, Conn.

[73] Assignee: Yardney Electric Corporation, Pawcatuck, Conn.

[21] Appl. No.: 787,666

[22] Filed: Apr. 14, 1977

[51] Int. Cl.² .................................................. H01M 12/06
[52] U.S. Cl. ...................................... 429/72; 429/101; 429/120; 429/206
[58] Field of Search ...................... 429/26, 27, 12, 72, 429/101, 153, 152, 120, 17, 40, 46, 223, 206, 156, 149

[56] References Cited

U.S. PATENT DOCUMENTS

| | | | |
|---|---|---|---|
| 3,544,375 | 12/1970 | Ruben | 429/21 |
| 3,669,744 | 6/1972 | Tsenter et al. | 429/223 X |
| 3,834,944 | 9/1974 | Dennison | 429/26 |
| 3,850,694 | 11/1974 | Dunlop et al. | 429/21 |
| 3,867,199 | 2/1975 | Dunlop et al. | 429/59 X |
| 3,990,910 | 11/1976 | Giner | 429/59 |

Primary Examiner—Anthony Skapars

Attorney, Agent, or Firm—Donald E. Nist

[57] ABSTRACT

The improved system of the present invention comprises a plurality of electrically interconnected power modules, each module comprising a sealed pressure vessel containing a volume of hydrogen and a plurality of batteries connected in parallel and disposed in a removable rack. Each battery comprises a stack or pile of series connected metal-hydrogen cells. Means are provided for recirculating the hydrogen in the vessel around and between the cells and for cooling the hydrogen. The cooling operation for the modules may be carried out internally or externally of the vessel. A blower or the like may facilitate the recirculation of the hydrogen.

The modules are series connected to supply a desired large amperage, for example to take care of peak load requirements for a commercial power generating station or the like. The system is capable of rapidly absorbing power from the station during periods of low demand and rapidly releasing the power during peak loads so as to level the load requirements. The system provides optimum performance over a long period of time at low cost.

10 Claims, 4 Drawing Figures

METAL-HYDROGEN SECONDARY BATTERY SYSTEM

BACKGROUND OF THE INVENTION

1. Field of the Invention

The present invention generally relates to power systems and more particularly to an improved system utilizing metal-hydrogen secondary batteries.

2. Prior Art

It is desirable to operate electric power generators as continuously as possible at a constant load, preferably at or near their rated or most efficient load. However, energy requirements vary, depending upon the hour of the day. Peak power load requirements are usually in the daylight hours, particularly in the afternoon, while minimum power requirements are usually during nighttime hours, particularly after midnight. In the daily cycle of a typical power system the demand for power may vary by a ratio of 2:1 or more.

Various means can be employed to store energy during the periods when power requirements are low and dispense the stored energy during periods of peak load. Batteries for this purpose must be very large and capable of thousands of cycles without damage. Moreoever, they should be essentially immune to accidental abuses such as overcharge, overdischarge or lengthy standby, have a high energy ratio, for example, 80%, that is, be relatively efficient and provide the desired functions at a relatively low cost. Various types of batteries used heretofore for such purposes have failed in one or more respects to provide the desired low cost and high performance necessary over long periods of time. It would therefore be desirable to provide an efficient load-leveling system for electric power systems.

SUMMARY OF THE INVENTION

The foregoing objects have now been satisfied by the improved metal-hydrogen secondary battery system of the present invention. The system is uniquely adapted for use in leveling power demands from an electric power generating source, but is also useful for other purposes. The system is substantially as set forth in the Abstract above.

The system includes a plurality of series connected power modules which may be located near to or remote from the power generating source. Each module is a sealed pressure vessel containing a relatively large volume of hydrogen and a plurality of batteries connected in parallel and stacked in a removable rack. Each battery consists of a pile of series connected metal-hydrogen cells.

Hydrogen is continuously circulated around and through each of the cells by means of a blower system disposed in the hydrogen flow path in the vessel. Cooling means either within or outside of the vessel cool the hydrogen in the flow path. The flow path includes a central passageway formed by central openings in the stacked piles of cells and a peripheral passageway around the rack, the two passageways being interconnected by transverse passageways between the individual cells which expose the anodic surfaces of each cell to hydrogen.

Each cell preferably is disc-shaped and includes a suitable cathode, for example a porous sintered nickel cathode containing nickel hydroxide in the interstices thereof, an anodic surface formed, for example, from a screen covered with porous tetrafluoroethylene, upon which is deposited a film of finely divided platinum black powder catalyst or the like, and a separator between the cathode and anode. The separator comprises, for example, asbestos, or paper or the like which bears aqueous potassium hydroxide as the electrolyte. A metal grid in the form of corrugated expanded metal is disposed between the anodic surface of one cell and the cathode of the adjoining cell and is used as a series connector for the cells as well as means for channeling hydrogen to the anodic surface and to the central passageway.

The modules are series connected and may be disposed in racks or the like which may utilize common cooling means such as a water spray tower. Water sprayed on the shell of each vessel can effectively remove heat from the hydrogen circulating within each vessel adjacent the shell. In one embodiment, each vessel contains its own cooling system utilizing heat exchanger tubes, coolant and pumping means.

Preferably, each module is in the form of an elongated cylinder with a closed bottom and a removable top cover to which the rack containing batteries disposed in shelves thereof is secured. The rack can be withdrawn by lifting the cover so that the individual batteries can be inspected, replaced, repaired, etc.

The described system is capable of generating, for example, about 1000 amps at 62.5 volts from each module. Sixteen of such modules in series are capable of discharging a thousand amps at a thousand volts at a ten-hour rate. Various other power requirements can be met utilizing the present system. The system can be operated over a large number of charge-discharge cycles, as many as 5,000 to 10,000 or more, with no more than periodic monitoring of electrical and physical functions. Its cells are very durable and efficient. Maintenance is low or nonexistent. The system is therefore ideally adapted for leveling of power requirements. Further features of the invention are set forth in the following detailed description and drawings.

DRAWINGS

DETAILED DESCRIPTION

Figure 1:
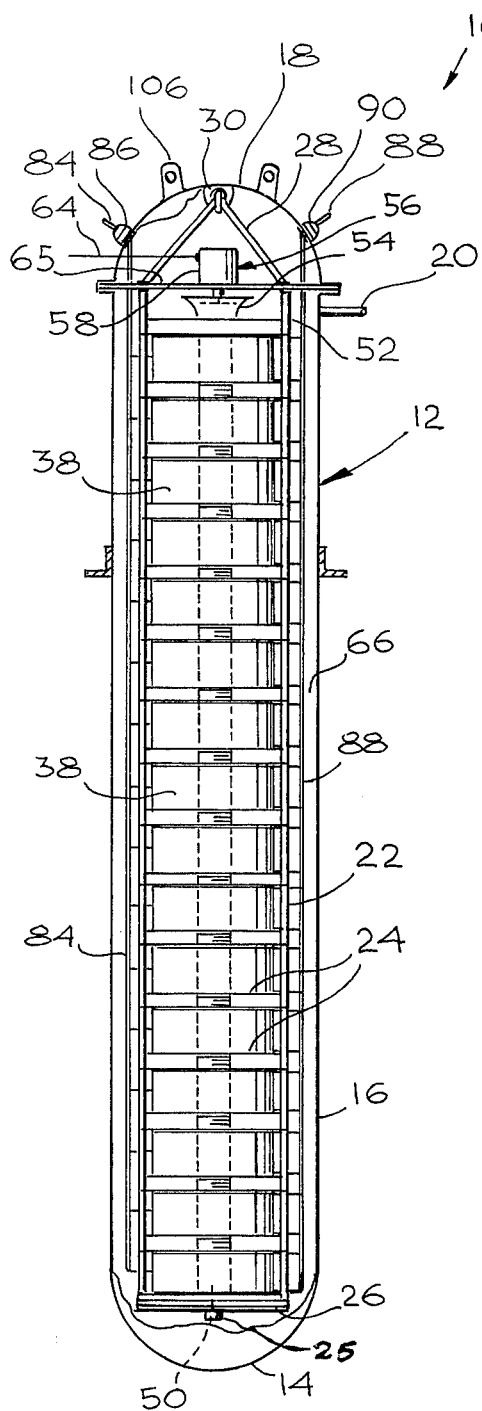
FIG. 1 is a schematic front elevation, partly broken away, of a preferred embodiment of one of the power modules of the improved secondary battery system of the present invention.
Figure 4:
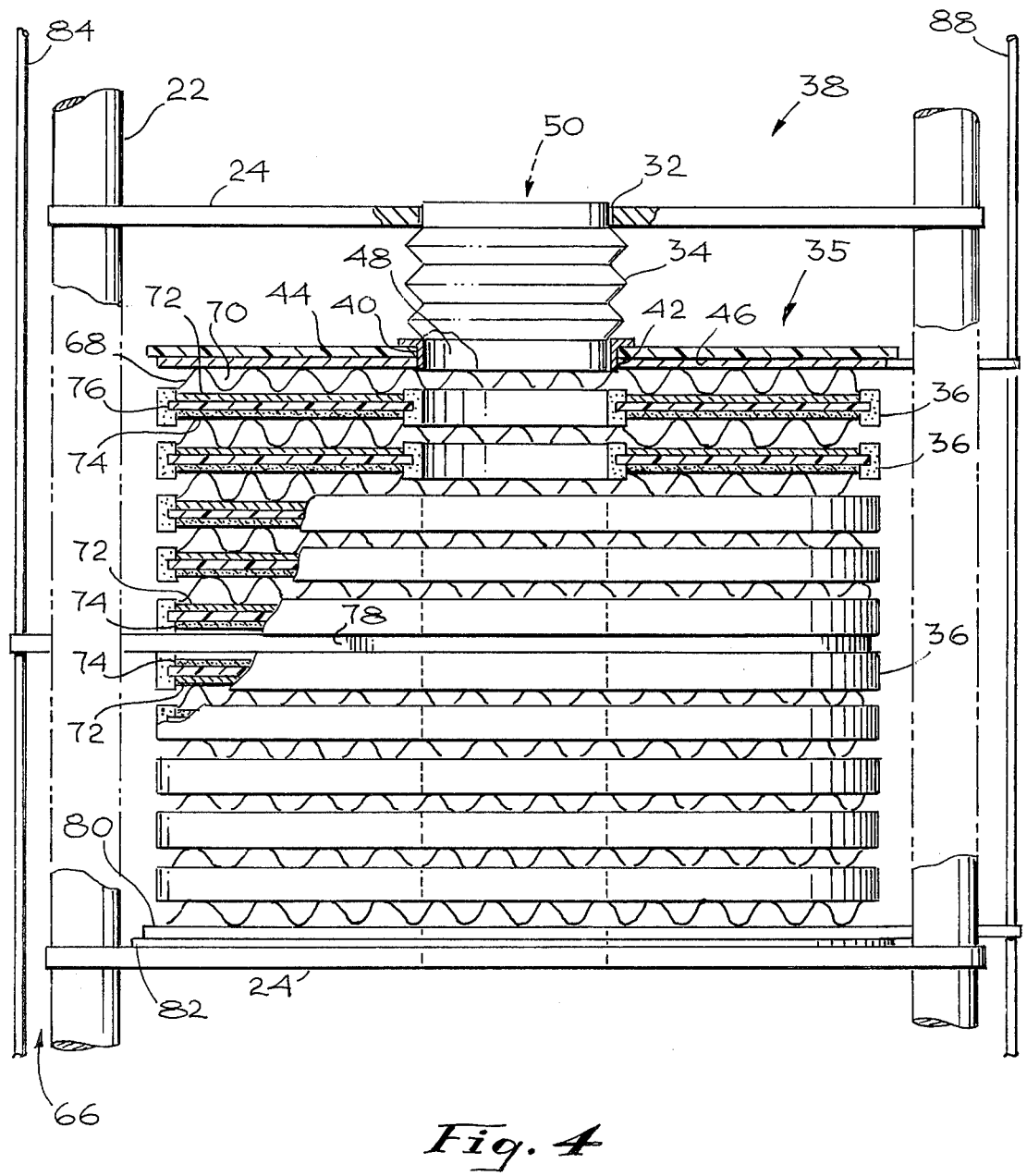

FIGS. 1 and 4

Now referring more particularly to FIG. 1 of the accompanying drawings, a preferred embodiment of one of the modules of the improved secondary battery system of the present invention is schematically depicted in front elevation. Thus, a module 10 is shown which comprises a sealed pressure vessel 12, preferably of generally cylindrical configuration, and having a bottom wall 14, side wall 16 and a removable top cover 18. Vessel 12 is hollow and is provided with a conduit 20 for the introduction thereinto of hydrogen gas. In the operative condition, vessel 10 is filled with hydrogen gas.

Vessel 12 has disposed therein an elongated, preferably vertical, rack 22 containing a plurality of shelves 24. The lower end of rack 22 is centered by a projection 25 through plate 26 while the upper end of rack 22 is secured by links 28 to an insulated support bracket 30 connected to the underside of top cover 18. Each shelf 24, as more particularly shown in FIG. 4, has a central opening 32 therein fitted with a compressible hollow bellows 34 which compresses a pile 35 of cells 36 stacked together within shelf 24 to form battery 38 of said shelf. The lower end of bellows 34 is positioned within the aligned central openings 40 and 42 of, respectively, an insulator plate 44 and an electrical terminal plate 46 and over the aligned central openings 48 in the stacked pile 35 of cells 36. Accordingly, bellows 34, together with openings 32, 40, 42 and 48 for the various shelves 24 form a continuous central passageway 50 extending from plate 26 to the upper end 52 of rack 22. At said upper end 52, the intake end 54 of a blower 56 is connected to passageway 50. Blower 56 may include a motor 58 and rotor shaft 60 connected to a fan 62 (FIG. 2) and may be electrically powered as by a conduit 64 extending through cover 18. Blower 56 may be secured to top cover 18, as by a plate 65, or the like.

Now referring more particularly to FIG. 4, a pile of cells 36 is shown within shelf 24 of rack 22 compressed together by bellows 34. Disposed above the pile of cells 36 is insulative plate 44, for example, of plastic, or the like. Next below plate 44 is an electric terminal plate 46 of nickel, copper, etc. Preferably, although not necessarily, cells 36 and plates 44 and 46 are generally circular in outline. Moreover, rack 22, as particularly shown in FIG. 1, is spaced inwardly of side wall 16 in vessel 12 so as to provide a peripheral passageway 66 between rack 22 and side wall 16.

Each cell 36 within pile 35 in shelf 24 is spaced from the next adjacent cells 36 by a grid 68 which provides a series of transverse passageways 70 between peripheral passageway 66 and central passageway 50. Each grid 64 is so arranged that hydrogen can freely pass there through and intimately contact anodic surface 72 of each cell 36 while also acting as a coolant. Grids 64 have the additional function of electrically interconnecting in series all the cells 36 in pile 35.

Each cell 36 may be formed of any suitable materials which provide an efficient metal-hydrogen cell. For example, cathode 74 of each cell 36 may comprise a plate formed of nickel powder which has been compressed and sintered to a porous self-supporting condition, and the interstices of which contain active nickel hydroxide. The cathode 74 of each cell 36 is separated from the anodic surface 72 of that cell by a separator 76 which may comprise a sheet or the like of suitable nonconductive material such as asbestos, or paper or other celluosic fiber material or the like which bears or is impregnated with aqueous potassium hydroxide or other suitable metal-hydrogen electrolyte. The anodic portion 72 of each cell 36 may comprise a metallic (such as nickel) or a non-metallic (such as nylon) screen which has been covered with tetrafluorethylene to leave it in a porous condition and upon which has been deposited a suitable catalyst such as finely divided platinum black powder catalyst as a film or the like. In a metal-hydrogen cell the hydrogen itself is the true anode while the anodic component 72 provides the catalyst for the reaction.

Grid 68 which is disposed between adjacent cells 36 may comprise any suitable electrically conductive material, for example, corrugated, expanded nickel or other metal, preferably one which is corrosion resistant.

It will be understood that while nickel-hydrogen cells 36 are preferred and have been described above, other metal-hydrogen cells known within the art, for example, oxides and oxide mixtures of cobalt, copper, silver, mercury, manganese, chromium and lead, could be used in batteries 38.

Preferably, pile 35 of cells 36 within each shelf 24 and constituting a single battery 38 is divided into two halves, an upper half above a central terminal plate 78 and a lower half below central terminal plate 78. The lower end of pile 35 also abuts an electric terminal plate 80 on an insulative plate 82. Terminal plates 46 and 80 have the same polarity, which polarity is opposite that of central terminal plate 78. The cell stacking sequence within the upper half of pile 35 in each shelf 24 is opposite to the cell stacking sequence within the lower half of that pile 35, as shown in FIG. 4, so that single central terminal plate 78 can service both halves of pile 35.

Batteries 38 within each module 10 preferably are electrically connected in parallel. Thus, each central terminal plate 78 extends to and interconnects with an electrical conduit 84 running outside of rack 22 within vessel 12 along the length thereof and extending outside of vessel 12 through a fitting 86. All terminal plates 46 and 80 extend to and interconnect with an electrical conduit 88 outside of and running the length of rack 22 in vessel 12 and extending out from vessel 12 through fitting 90.

Figure 2:
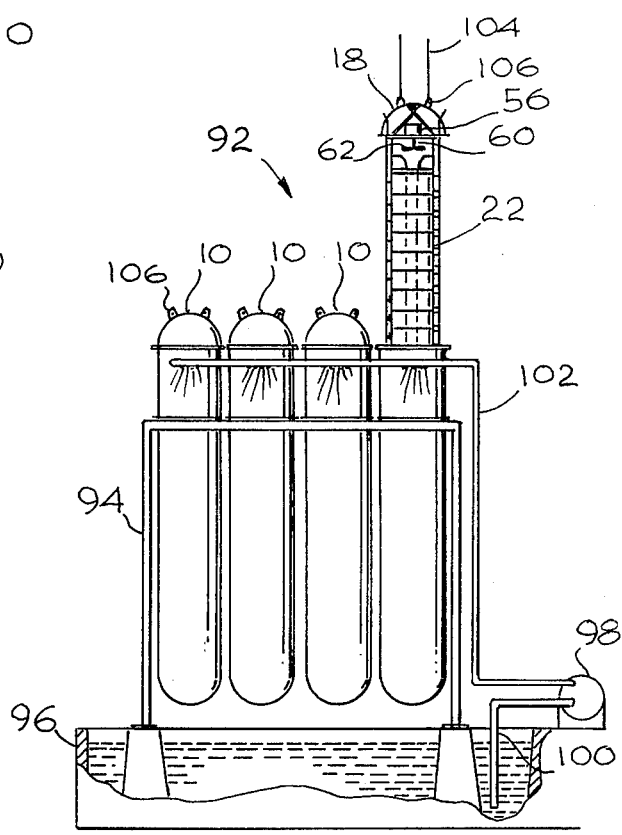
FIG. 2 is a schematic side elevation, partly broken away and partly in section, of a plurality of the modules of FIG. 1 disposed within a rack and subjected to cooling by a spray tower, a battery-containing rack also being shown during lifting thereof from one of said modules.
Figure 3:
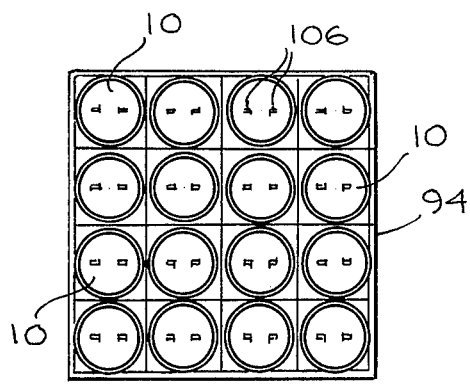
FIG. 3 is a schematic top plan view of the modules of FIG. 2 assembled in the rack thereof; and, FIG. 4 is a schematic side elevation, partly in cross-section, showing the upper and lower portions of a pile of metal-hydrogen cells constituting a single battery within a shelf in the rack within the module of FIG. 1.

FIGS. 2 and 3

Now referring more particularly to FIGS. 2 and 3 of the accompanying drawings, a plurality of modules 10 are shown assembled together to form the improved secondary battery system 86 of the present invention. The modules preferably are series connected (not shown). Modules 10 are disposed within a rack 94 which rests on a water-filled cooling basin 96 provided with a pump 98, suction line 100 and water spray conduit 102 for the application of cooling water spray to the exterior of each vessel 12 in rack 94.

FIG. 2 also shows a rack 22 of a module 10 being lifted out from the top of that module with cover 18 thereof by lines 104 connected to hooks or grommets 106 on cover 18. Thus, batteries 38 within rack 22 can be readily removed, inspected, repaired, replaced, etc.

During operation of module 10, blower 56 continuously recirculates hydrogen along the desired path in vessel 12. Such path is defined by peripheral passageway 66, transverse passageways 70 and central passageway 50. This continuous recirculation of hydrogen causes a heat transfer between cells 36 and the hydrogen and between the hydrogen and the shell (walls 14, 16 and 18) of vessel 12 so as to cool the hydrogen and cells 36. It also sweeps hydrogen continuously into contact with anodic surfaces 72 so as to optimize the operation of cells 36. The shell of vessel 12 can act as the only cooling means for the hydrogen, by dissipating heat to the atmosphere. However, this cooling effect preferably is amplified through the use of a spray of water on the shell of each vessel 12, as by the operation of pump 98 and conduits 100 and 102 (FIG. 2). It is also contemplated that, if desired, an internal cooling system could be provided within each module 10 (not shown). Such system could include, for example, cooling coils within which a heat transfer medium could be recirculated, as by pumping or the like.

The improved secondary battery system of the present invention provides an optimum design and arrangement for exploiting the valuable properties of metal-hydrogen cells, particularly nickel-hydrogen cells. With this arrangement, each cell 36 is placed in the most favorable environment for its performance. Moreover, the modular system of the present invention allows for indefinite enlargement and expansion of the number of modules so as to be able to accommodate a wide variety of energy demands.

All active materials of cells 36 are recycled indefinitely. Each vessel is sealed and of sufficient volume to contain the full charge of hydrogen. Hydrogen is superior to oxygen as a heat transfer and cooling medium. This fact, together with the high efficiency of cells 36, may allow cooling through the vessel shell in place of an internal heat exchanger.

The temperature of the hydrogen is kept within about 60° F. of that of the atmosphere, preferably by means of the cooling water spray on the exterior of each vessel. It will be noted that cells 36 cannot be overheated or otherwise damaged by overcharge or overdischarge. Moreover, the pressure of the hydrogen in each vessel 12 is a reliable measure of the state of charge. High and low pressure limits can be measured and set to control charging to and discharging from each vessel. Chemically, each cell 36 is stable and not liable to unwanted reactions. The hydrogen in each vessel 12 can circulate freely around the wetted nickel cathodes without adverse effect. Each cell is subject to a low rate of discharge and each battery is relatively immune to atmospheric conditions. The only low temperature cut-off point for the batteries is the freezing point of the electrolyte, usually about minus 40° F. Each cell normally operates at a substantially higher temperature such as 160° F. Modules 10 normally need no weather protection.

If a relatively high voltage, for example, 1,000 volts, is desired, it is not feasible to utilize a single battery inclosure due to the hazard of sparking and because of excessive short circuit leakage loss. Instead, multiple series connected modules, such as are utilized in the present invention, provide the solution. Thus, desired voltage is obtainable with the present system in a safe, efficient way. In a typical installation utilizing the improved secondary battery system of the present invention, 16 steel cylindrical modules are employed, each of which has a vertical steel rack connected to its cover with 16 batteries connected in parallel disposed within the shelves of the rack. Each module tank is totally sealed and charged with hydrogen at a pressure of about 500–100 psia, the maximum pressure representing the fully charged state and the minimum pressure representing the fully discharged state. Actual pressures will be within these limits. Each battery within each module may have 48 cells, each cell operating to produce, for example, 1.304 volts, for a total of 62.5 volts. Each cell may be, for example 28 inches O.D. × 8.5 inches I.D. The cells within each battery are arranged in series and the 16 modules are series connected to yield a total of 1,000 amps at 1,000 volts. The current output of each battery is 62.5 amps. The output of each module is therefore 1,000 amps at 62.5 volts.

The improved secondary battery system of the present invention is suitable for various purposes, as will be apparent. Other advantages of the present system are as set forth in the foregoing.

Various modifications, changes, alterations and additions can be made in the present system, its components and parameters. All such modifications, changes, alterations and additions as are in the scope of the appended claims form part of the present invention.

What is claimed is:

1. An improved metal-hydrogen secondary battery system, said system comprising, in combination, a plurality of electrically interconnected power modules, each said module comprising, in combination:
    A. a totally sealed pressure vessel having endwalls and sidewalls and containing a volume of hydrogen;
    B. a plurality of substantially identical stacked batteries connected in parallel in each said vessel, each said battery comprising a pile of spaced series connected metal-hydrogen cells;
    C. means holding said stacked betteries in said vessel for ready withdrawal therefrom; and,
    D. means within said vessel for circulating and recirculating hydrogen around and between said cells and means external of said vessel for cooling said hydrogen by indirect heat exchange through said vessel walls.

2. The improved system of claim 1 wherein said modules are connected in series to supply I amperes at E volts utilizing N modules, each module having N batteries, each said battery adapted to supply I/N amperes at E/N volts.

3. The improved system of claim 1 wherein said stacked batteries are spaced inwardly of said vessel walls to define therewith a peripheral passageway, wherein said cells and batteries define a central passageway interconnected with said peripheral passageway and wherein said means for circulating hydrogen includes a blower.

4. The improved system of claim 1 wherein said vessel is cylindrical and wherein said batteries are disposed on transverse shelves in a vertical rack forming said holding means.

5. The improved system of claim 4 wherein said vessel includes a removable cover and wherein said rack is supported by said cover.

6. The improved system of claim 5 wherein said cells are disc-shaped with a central opening forming part of said central passageway, which passageway is vertical and terminates at the suction end of said blower.

7. The improved system of claim 6 wherein adjacent ones of said cells are spaced apart and series connected by an open metallic grid forming a passageway interconnecting said peripheral and said central passageways to form therewith a hydrogen flow path in said vessel.

8. The improved system of claim 7 wherein said pile of cells in each said battery are divided into upper and lower halves, adjacent ends of said halves being connected to a central terminal of a given polarity while opposite ends of said halves are connected to terminals of polarity opposite to said given polarity.

9. The improved system of claim 8 wherein each said pile is releasably compressed within each said shelf by a removable bellows, and wherein each said cell comprises a nickel cathode containing nickel hydroxide and separated from a platinum catalyst-bearing anodic surface by an aqueous potassium hydroxide-bearing separator.

10. The improved system of claim 8 wherein said modules are connected to a common one of said external cooling means.

* * * * *